United States Patent [19]

Yoshida

[11] Patent Number: 4,505,164

[45] Date of Patent: Mar. 19, 1985

[54] AUTOMATIC TRANSMISSION MECHANISM WITH SPINDLE-SHAPED FRICTIONAL CLUTCH MEMBERS INCORPORATED THEREIN

[76] Inventor: Tokuichiro Yoshida, 13-14 Ise-cho, Kawasaki-ku, Kawasaki 210, Japan

[21] Appl. No.: 309,689

[22] Filed: Oct. 8, 1981

[51] Int. Cl.³ .............................................. F16H 3/08
[52] U.S. Cl. ........................................ 74/371; 74/337
[58] Field of Search ................... 74/371, 337; 192/55, 192/54, 76, 89 R, 20, 48.1, 97, 94

[56] References Cited

U.S. PATENT DOCUMENTS

| | | | |
|---|---|---|---|
| 1,664,303 | 3/1928 | Mayer | 74/371 |
| 1,812,445 | 6/1931 | Mayer | 74/371 |
| 2,045,835 | 6/1936 | Coen | 74/371 |
| 2,062,523 | 12/1936 | Miller et al. | 74/337 |
| 2,237,433 | 4/1941 | Hofmann Jr. | 74/337 |
| 3,154,962 | 11/1964 | Mukherjee | 74/371 |

FOREIGN PATENT DOCUMENTS 1277739  10/1961  France .................. 74/371

*Primary Examiner*—Leslie A. Braun
*Assistant Examiner*—Dwight G. Diehl
*Attorney, Agent, or Firm*—Cantor and Lessler

[57] ABSTRACT

A new and unique automatic transmission mechanism to be preferably mounted on an automobile or the like is disclosed which contains two gear assemblies as essential components. The first gear assembly generally comprising four gear elements of a low gear, a second gear, a third gear and a top gear is arranged freely rotatable on an engine output shaft with a clutch holder axially displaceably disposed therebetween, whereas the second gear assembly comprising a single solid multi-stage driven gear is fixedly arranged on a driven shaft. The first gear assembly meshes with the second gear assembly in such a manner that a certain gear element of the former meshes with a corresponding gear section of the latter. Generally the clutch holder has four recesses at an equal angular distance in which spindle-shaped clutch members having a frictional surface are radially displaceably received so as to ensure tight frictional engagement between the clutch holder on the screw-threaded engine output shaft and one of the four gear elements. A coil spring is contained in the hollow space defined by the bores of the gear elements. Prior to the starting operation the clutch holder is located in the bore of the top gear by the resilient force of the coil spring.

4 Claims, 3 Drawing Figures

AUTOMATIC TRANSMISSION MECHANISM WITH SPINDLE-SHAPED FRICTIONAL CLUTCH MEMBERS INCORPORATED THEREIN

BACKGROUND OF THE INVENTION

1. Field of the Invention

The present invention relates to an automatic transmission mechanism preferably employed for an automobile or the like and more particularly relates to an automatic transmission mechanism with a plurality of spindle-shaped frictional clutch members disposed in a clutch holder which is adapted to be axially displaced in dependence on a torque load from a driven shaft.

2. Description of the Prior Art

The conventional transmission mechanism is constructed such that gear changing is effected between both driving and driven gear assemblies by manually or automatically displacing or shifting an intermediate gear or gears with the aid of a suitable control lever mechanism, for instance, when starting running of an automobile or going up a hill. Specifically, when starting running, gear changing is effected by way of a low gear, a second gear, a third gear and finally a top gear. Further, when going up a hill, gear changing is returned to the third gear or the second gear, whereas when going up a steep hill, gear changing is returned further to the low gear by way of the second gear. On the other hand, when the car runs on level road again, the gear changing mechanism is shifted back to the top gear. During gear changing with the conventional transmission mechanism it is usually necessary to turn off a clutch mechanism. As is well known, the conventional transmission mechanism is very complicated in structure and thereby is manufactured at an expensive cost.

SUMMARY OF THE INVENTION

The present invention is intended to effect gear changing with the aid of frictional clutch means contained in the driving gear assembly without any necessity for the conventional gear changing or shifting mechanism by means of which an intermediate gear or gears are displaced or shifted. The transmission mechanism in accordance with the present invention requires no intermediate gear or gears as well as no means for actuating the same.

As an essential component for the automatic transmission mechanism of the invention a clutch holder with a plurality of spindle-shaped frictional clutch members radially displaceable disposed therein is contained in the first gear assembly. Specifically, the transmission mechanism of the invention contains two gear assemblies comprising the first and second gear assemblies in a casing, the former being freely rotatable on an engine output shaft, while the latter being fixedly mounted on a driven shaft. The first gear assembly contains a plurality of gear elements each of which is arranged side by side in such a manner that it is free to rotate independently of adjacent ones with bearing means in the form of a number of balls disposed between both side faces of the adjacent gear elements. On the other hand, the second gear assembly comprises a single solid multi-stage driven gear containing a plurality of gear sections corresponding to the gear element in the first gear assembly. It is to be noted that both the gear assemblies are constructed such that the foremost gear element has the largest diameter and the rearmost gear element has the smallest diameter in the first gear assembly, while the foremost gear section has the smallest diameter and the rearmost gear section has the smallest diameter in the second gear assembly.

The respective gear elements in the first gear assembly have a considerably large bore sufficient to displaceably receive the clutch holder. A coil spring is contained in the axially extending hollow space defined by the bores of the gear elements, of which one end abuts against the inner face of the recessed part of the side wall of the casing and of which other end comes in contact with the one side face of the clutch holder, so that the latter tends to be thrusted toward the front side of the casing. Prior to starting operation the clutch holder is located in the bore of the foremost gear element in the first gear assembly by means of the resilient force of the coil spring. The engine output shaft has a line of screw thread provided by a certain distance across the width of the first gear assembly so as to ensure axial displacement of the clutch holder against the coil spring.

As the engine output shaft starts to rotate, the clutch holder is axially displaced to be located in the bore of a certain gear element in the first gear assembly where torque balance is achieved between both the gear assemblies so as to effect power transmission from the engine output shaft to the driven shaft, wherein power transmission is ensured by way of frictional contact between the frictional surfaces of the spindle shaped clutch elements in the clutch holder and the annular groove on the bore of said gear element. While the torque load is large, the clutch holder is thrusted rearwards, for instance, to the low gear where the highest reduction ratio is achieved. As the driven shaft rotates at a higher rotational speed, the clutch holder is squeezed back by disengaging the frictional contact between the frictional surface of the spindle-shaped clutch members and the annular groove in a certain gear element by means of the resilient force of the coil spring.

Thus, it is an object of the present invention to provide a new and unique automatic transmission mechanism which requires no intermediate gear or gears as well as no actuating or shifting means of the same.

It is other object of the present invention to provide an automatic transmission mechanism which effects gear changing without operating any clutch means as is the case with the conventional transmission mechanism.

It is another object of the present invention to provide to an automatic transmission mechanism which is simple in structure and thereby is manufactured at an inexpensive cost.

Other objects and advantageous features will be apparent from the following description made with the accompanying drawings.

BRIEF DESCRIPTION OF THE ACCOMPANYING DRAWINGS

Now the present invention will be described in more detail with reference to the accompanying drawings which illustrate a preferred embodiment of the present invention, in which.

DETAILED DESCRIPTION OF THE INVENTION

Figure 1:
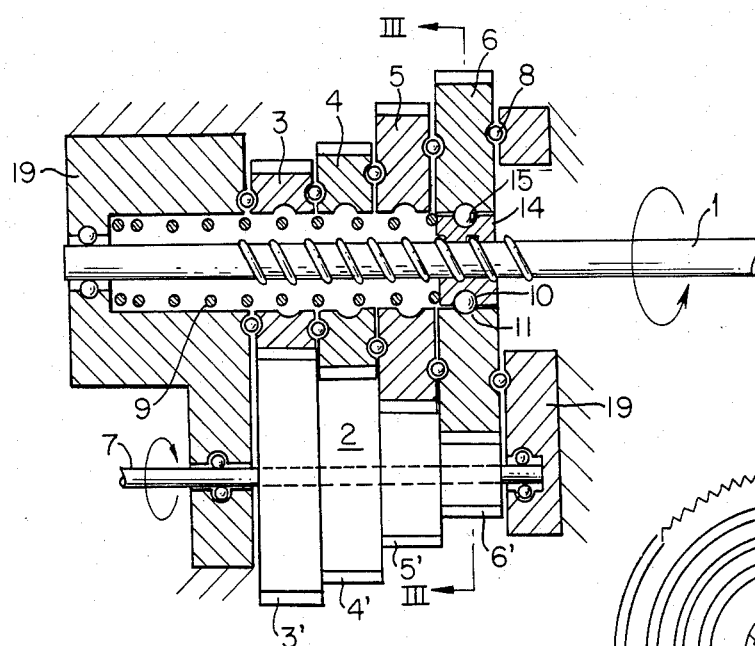
FIG. 1 is a vertical sectional view of an automatic transmission mechanism in accordance with the invention.
Figure 2:
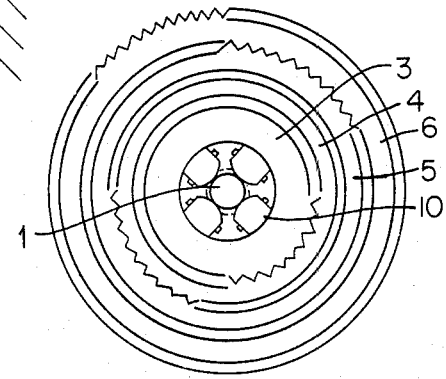
FIG. 2 is a front view of the transmission mechanism in FIG. 1 with the transmission mechanism casing removed.

The automatic transmission mechanism of the invention contains two gear assemblies comprising the first and second gear assemblies, the first gear assembly being adapted to be driven by an engine output shaft 1 and comprising a low gear 3, a second gear 4, a third gear 5 and a top gear 6, while the second gear assembly being a single solid multi-stage driven gear 2 by means of which a driven shaft 7 is rotated at a certain required number of rotations. It is to be noted that the respective gears 3, 4, 5 and 6 on the driving side are rotatable separately from one another with a plurality of bearing means 8 in the form of a number of balls arranged on a certain circle between any two adjacent gears, while the multi-stage driven gear 2 contains four gear sections 3', 4', 5' and 6' integrally secured to one another, said gear section 3' corresponding to the low gear 3, said gear section 4' corresponding to the second gear 4, said gear section 5' corresponding to the third gear 5 and said gear section 6' corresponding to the top gear 6. Two groups of gears 3 to 6 and 3' to 6' are rotatably supported between both side walls of a transmission casing 19 which is shown partially fragmented for illustrative clarity and the driven shaft 7 is rotated in the opposite direction to the engine output shaft 1 by way of the above-described gearing mechanism.

The respective gears 3 to 6 have a considerably large bore in which a clutch holder 14 is axially displaceably received, said clutch holder 14 forming one of the essential components for the transmission mechanism of the invention. Further, in the bores of the respective gears 3 to 6 is provided a coil spring 9 of which one end abuts against the inner face of the left side wall of the transmission casing and of which the other end comes in contact with the side face of said clutch holder 14 so as to urge the latter outwards in the axial direction.

As is apparent from FIG. 1, the engine output shaft 1 has a screw thread by a certain distance on which the clutch holder 14 is displaceably mounted.

Figure 3:
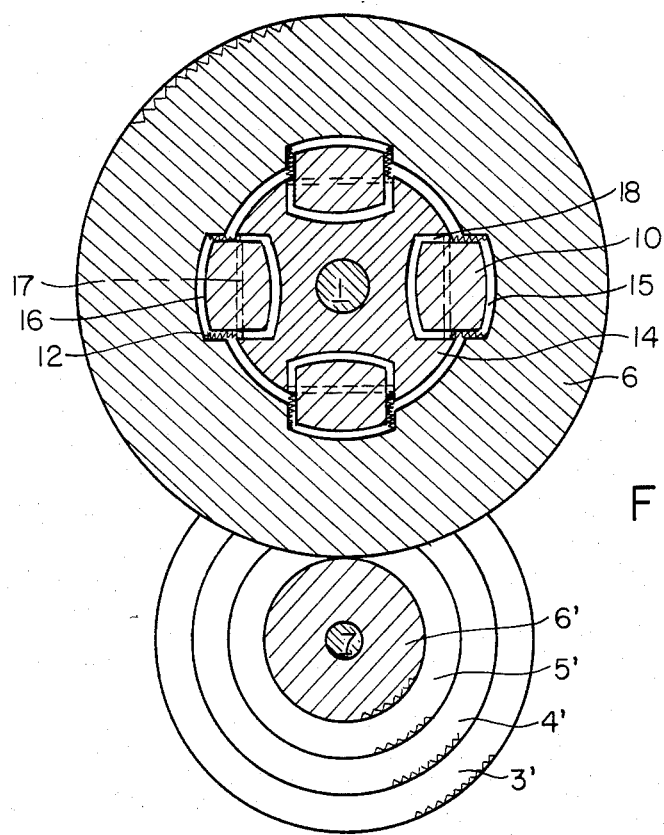
FIG. 3 is a cross-sectional view of the transmission mechanism taken in line III—III in FIG. 1, shown in an enlarged scale.

Further, as illustrated in FIG. 3, the clutch holder 14 has four recesses 18 on the periphery thereof in which spindle-shaped clutch members 10 are radially displaceably received respectively, said spindle-shaped clutch members 10 containing a frictional surface 16 respectively which comes in contact against the annular groove 15 on the bore of the respective gears 3 to 6. Further, the respective clutch members 10 are rotatably supported on a pin 17 which is resiliently carried by means of a pair of spring means 12 at both ends in such a manner that the clutch members 10 are always thrusted in the outward direction.

The clutch holder 14 containing the four spindle-shaped clutch members 10 is located in the bore of one of the gears 3 to 6, when a torque balance is achieved between the output shaft 1 and the driven shaft 7 at a properly controlled gear ratio at said one of the gears 3 to 6. As the torque load on the driven shaft increases and thereby the corresponding gear on the output shaft 1 fails to rotate the driven gear 2, the clutch holder 14 is displaced against the coil spring 9 by way of the screw thread on the output shaft 1, until a torque balance is achieved at the next gear or the gear beyond said next gear.

It is to be noted that the spring means 12 in the recesses of the clutch holder 14 are properly controlled so that the frictional surface 16 of the spindle-shaped clutch members 10 is brought in contact with the annular groove 15 of the gear with a reasonably high frictional force.

Now operation of the transmission mechanism of the invention will be described below.

When the output shaft 1 starts to rotate, the first combination of the top gear 6 and the gear section 6' fails to effect power transmission due to heavy load torque from the driven shaft 7. Then, the clutch holder 14 is thrusted to the left by means of the screw thread on the output shaft 1 against the coil spring 9 with the clutch members 10 depressed from the annular groove 15, until it reaches the bore of the next third gear 5. If the second combination of the third gear 5 and the gear section 5' fails to start to rotate the driven shaft 7 for the same reason as mentioned above, the clutch holder 14 is further thrusted to the next gear combination and the same thrusting is repeated until a proper gear ratio is achieved at the last combination of the low gear 3 and the corresponding gear section 3' where the low gear has the minimum diameter while the corresponding gear section 3' has the maximum diameter. Now the driven shaft 7 starts its rotation and as time elapses, rotational speed increases and running torque load is gradually reduced, whereby the coil spring 9 becomes effective in thrusting the clutch holder 14 back toward the top gear 6.

During the thrusting movement of the clutch holder 14 the spindle-shaped clutch members 10 are rotated about the pins 17 under frictional contact between their frictional surface 16 and the annular groove 15 caused by means of the spring means 12 so that the clutch holder 14 is displaced to the next gear combination in a moment. It is to be noted that the clutch holder 14 is always axially displaceably mounted on the output shaft 1 by way of the screw thread.

Since torque transmission is effected by means of a plurality of spindle-shaped frictional clutch members arranged about a clutch holder without any necessity for the conventional gear changing or shifting mechanism, as described above, the automatic transmission mechanism of the invention ensures torque transmission at a very high operative efficiency and moreover it is manufactured at an inexpensive cost.

What is claimed is:

1. An automatic transmission mechanism with a plurality of spindle-shaped frictional clutch members incorporated therein comprising:
   (A) a casing having a front wall portion and a rear wall portion,
   (B) two gear assemblies contained in said casing, comprising a first gear assembly meshing with a second gear assembly, wherein said first gear assembly comprises a plurality of coaxial gear elements through which an engine output shaft extends, each of said gear elements having a different diameter in such a manner that the gear element adjacent the front wall portion has the largest diameter and the gear element adjacent the rear wall portion has the smallest diameter, said gear elements having a large bore to receive a clutch holder therein and having a plurality of recesses equally spaced apart in an inner wall thereof, while said second gear assembly comprises a single solid multi-stage gear assembly, containing the same number of gear sections as that of gear elements in the first gear assembly, through which a driven shaft is fixedly extended in parallel to the engine output shaft, each of said gear sections having a different diameter in such a manner that the gear section adjacent the front wall portion has the smallest diameter and the gear section adjacent the rear wall portion has the largest diameter so that a certain gear element in the first gear assembly meshes with a corresponding gear section in the second gear assembly, (C) said gear elements in the first gear assembly being freely rotatable separately from each other with the aid of bearing means in the form of a number of balls disposed between the side faces of two adjacent gear elements or between the inner wall of the casing and the side wall of the gear element, (D) a clutch holder having an axial width essentially corresponding to the thickness of a single gear element and being axially slideably disposed in said large bore and having an axial bore, (E) said engine output shaft having a screw thread formed thereon across the width of the first gear assembly so that said clutch holder is axially displaceably mounted with a spiral groove formed on the inner wall of the axial bore corresponding to said screw thread on the engine output shaft, (F) said clutch holder having recesses located at an equal angular distance in each of which a spindle-shaped clutch member is radially displaceably received to ensure a frictional contact against the corresponding annular groove on the inner wall of the bore of the respective gear elements, said spindle-shaped clutch member being rotatably supported by means of a pin extending therethrough of which both ends are resiliently supported by means of spring means, and (G) a coil spring contained in the hollow space defined by the bores of the gear elements of the first gear assembly, of which one end abuts against a side wall portion of the casing and of which the other end comes in contact with one side face of the clutch holder so that prior to a starting operation the clutch holder is located in the bore of the gear element adjacent the front wall portion in the first gear assembly and the coil spring is compressed in correspondence with the axial displacement of the clutch holder squeezed by way of the screw thread due to a torque load from the second gear assembly.

2. An automatic transmission mechanism as defined in claim 1, wherein the first gear assembly comprises four gear elements of a low gear, a second gear, a third gear and a top gear and prior to starting operation the clutch holder is located in the bore of the top gear by the resilient force of the coil spring.

3. An automatic transmission mechanism as defined in claim 1, wherein the respective spindle-shaped clutch members have a frictional surface so as to ensure the optimum engagement between the clutch holder and any one of the gear elements in the first gear assembly.

4. An automatic transmission mechanism as defined in claim 3, wherein the respective spindle-shaped clutch members are coated or lined with frictional material so as to ensure an increased frictional engagement between the clutch holder and any one of the gear elements in the first gear assembly.

* * * * *